Figure 1:
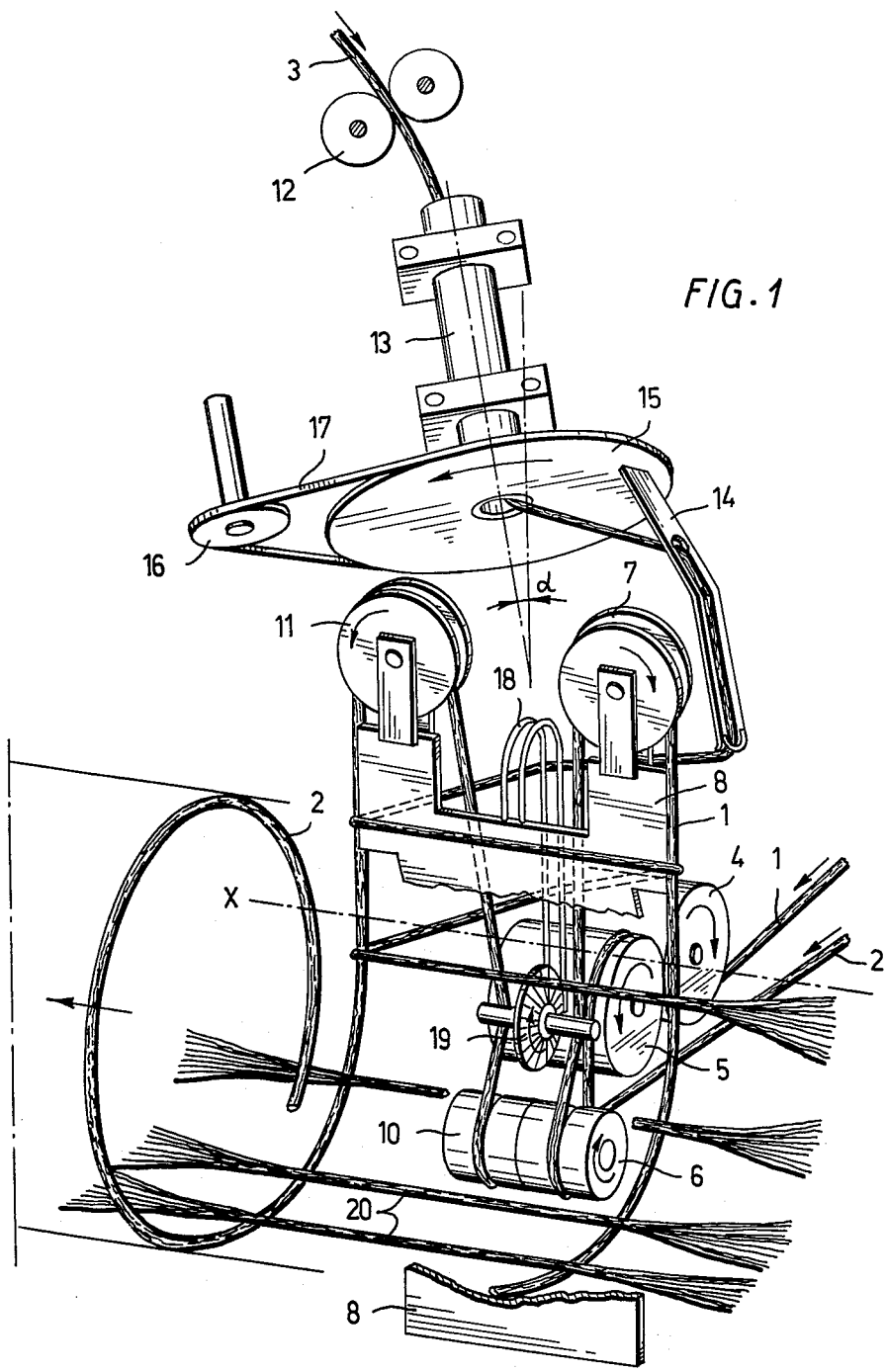

United States Patent [19]

Sundell

[11] 4,089,719
[45] May 16, 1978

[54] METHOD AND APPARATUS FOR FEEDING REINFORCING STRAND WHEN MAKING A TUBULAR PRODUCT

[76] Inventor: Olof Sundell, Prastangsgatan 5a A 13, 10600 Ekenas, Finland

[21] Appl. No.: 753,953

[22] Filed: Dec. 23, 1976

[30] Foreign Application Priority Data

Dec. 31, 1975 Finland .................................. 753754

[51] Int. Cl.² .......................................... B65H 81/00
[52] U.S. Cl. .................... 156/171; 138/172; 156/172; 156/173; 156/174; 156/426; 156/429; 156/431; 242/7.22; 428/36
[58] Field of Search ............... 156/169, 171, 172, 173, 156/175, 180, 181, 425, 428, 427, 429, 426, 430, 431, 441, 433, 434, 184, 187, 195; 428/36; 138/172, 129, 131, 144, 153; 242/7.21–7.23; 28/196

[56] References Cited

U.S. PATENT DOCUMENTS

| 2,797,728 | 7/1957 | Slayter et al. | 156/431 |
| 3,444,020 | 5/1969 | Kalwaites | 156/174 |
| 3,608,164 | 9/1971 | Bolles | 156/441 |
| 3,700,527 | 10/1972 | Grosh | 156/430 |

*Primary Examiner*—David Klein
*Assistant Examiner*—Michael W. Ball
*Attorney, Agent, or Firm*—Ladas, Parry, Von Gehr, Goldsmith & Deschamps

[57] ABSTRACT

In a method for feeding reinforcing strand when making a tubular product of plastic or other synthetic material, comprising supplying helically a supporting strand during rotation of a tube blank and applying a longitudinal reinforcing strand to the blank, the longitudinal reinforcement strand is in form of pieces cut off from a continuous strand after abutment thereof against the supporting strand. The continuous strand gradually displaces the cut off lengths of strand during the rotation of the tube blank. An apparatus for carrying out the method comprises means for feeding support helically around a rotating tube blank, means for feeding portions of additional reinforcing strand oriented in the direction of the tube blank to place the portions between the supporting strands and the tube blank, and means for cutting off said axially orientated reinforcing strands. The cutting is carried out when the strand portion is held by at least one supporting strand.

19 Claims, 6 Drawing Figures

U.S.Patent May 16, 1978 Sheet 1 of 4 4,089,719

METHOD AND APPARATUS FOR FEEDING REINFORCING STRAND WHEN MAKING A TUBULAR PRODUCT

The present invention relates to a method and an apparatus for feeding reinforcing strand when making a tubular product or other mantle surfaces, preferably of thermosetting plastic or other synthetic material, whereby at least one supporting strand included in the reinforcement is applied helically during rotation of the tube blank. Primarily, the invention relates to the manufacture of reinforced thermosetting plastic tubes made by means of forming a rotating tube blank on a rotating mandrel. With the invention, a casing is provided on the tube blank comprising a reinforcement orientated in the longitudinal direction of the tube and included in the tube wall and consisting preferably of glass fibre roving strand. The circularly wound reinforcement is produced according to previously known methods. The method is applicable to the manufacture of both thin- and thick-walled tubes of any diameters.

A common method to make reinforced plastic tubes is to wind various layers of a reinforcement of different nature during simultaneous feed of polyester resin on a rotating mandrel, said mandrel being either disposed to continuously feed the tube blank formed or intended to make by the piece pieces limited by the length of the mandrel. The first reinforcing layers may comprise a plurality of glass fibre roving strands wound helically with a coarse pitch and the next ones may comprise a woven roving formed by a strip of a certain width and with great strength in the cross-direction of the strip. A layer of glass fibre chips may still be applied before the method is repeated until a desired wall thickness is obtained and the process is finished off with, for example, additional helically wound layers.

Irrespective of the method, a very large number of circularly wound strands must be used in said methods in order to make the pitch angle big enough to obtain a sufficient bending strength. A large number of strands are naturally hard to handle and cause all sorts of difficulties. The strands must also be precisely guided to obtain a dense laminate. If a greater bending strength is required of such a gross-wound tube, especially of one with a big diameter, several layers of prefabricated fibre material with reinforcing strands in the longitudinal direction of the tube must be added for practical reasons. The use of prefabricated roving mats also causes problems when they are to be joined during rotation of the mandrel. The rhythm of the machines can then be disturbed resulting in interruptions in the operation which can be destructive particularly in a continuous production. All kinds of pretreated fibre materials are, of course, uneconomical and time-consuming as compared with fibre strands. Normally, the tube blank is also always formed by strand groups or a web forming uniform separate layers in the laminate and which, when exposed to certain mechanical damage, can separate from each other. Attention should also be paid to the thickness of the layers so that they do not cause cracking during setting.

Certain machines for the continuous production of fibre reinforced polyester resin tubes with a stationary tube blank are provided with several sets of rotary holders for fibre strand reels supplying the circularly wound strands. Of these, more sets are used for thick-walled tubes than for thin-walled ones. Between these reel sets, reinforcement orientated in the longitudinal direction of the tube is fed in several turns from fixed guides, said reinforcement being formed by endless glass fibre strands drawn from reels and densely spaced along the tube periphery. These machines are therefore very complicated and thick-walled tubes are practically impossible to make because the machine, due to a large number of strands and a big strand reel volume, usually becomes so complicated so as to be economically unjustifiable. The extensive run preparations and the fact that the resin impregnation must be carried out on several different locations also conduce to this. Known machines for continuously producing a rotating tube blank in principle operate in the same way, except that the tube formed has a more even thickness of material.

The object of this invention is to simplify and make the tube production less expensive by means of a method which simultaneously produces and supplies the tube blank with a fibre reinforcement orientated longitudinally. In combination with previously known simpler circular winding there is formed, despite a single concentrated supply of fibre and resin, a laminate that can replace other more expensive methods where the winding takes place on several locations and where more expensive fibre material is required. The method can be applied to all kinds of production using a rotating blank or mandrel. The invention also relates to an apparatus for carrying out the method.

In order to achieve said objects the method according to the invention is mainly characterized in that the longitudinal reinforcement is provided by means of pieces of reinforcing strand cut off from a continuous reinforcing strand to the final length only after the abutment thereof against the supporting strand, said continuous reinforcing strand thereby being guided so as to gradually displace the cut-off lengths of strand during the rotation of the tube blank in relation to each other along the periphery of the tube blank. The apparatus according to the invention comprises guide means for feeding at least one supporting strand to be helically wound on a rotating tube blank, guide and feed means for feeding portion of an additional reinforcing strand orientated in the axial direction of the tube blank so as to place said portions between the supporting strands and the tube blank, and cutting means for cutting off said axially orientated reinforcing strands, said cutting means being placed so that the cutting is carried out only after the strand portion is held by at least one supporting strand.

A corresponding method for winding tubes or mantles which directly and quite continuously, without disturbing interruptions for joining of fibre strands or other reinforcement, supplied fibre material oriented in the longitudinal direction of the tube to a rotating blank is not previously known.

The simplicity of the apparatus is a great advantage as the feeding of strand requires no rotary reel stand with a multitude of strands. The result in nevertheless a kind of cross-winding which, so to say, is built on the tube blank itself. The method therefore is completely different from previouly known methods. In addition, the actual reinforcing strands are formed longitudinally of the tube by a single fibre strand contrary to the large number of endless strands used in other machines. This strand, which is supplied at a speed which is a multiple of the peripheral speed of the mandrel, can form numerous longitudinal reinforcing strands, the number whereof is steplessly variable during operation and which are lined up along the periphery of the tube blank. Said advantage gives a number of possibilities to vary the construction and strength of the tube wall. The number of circularly wound strands can be calcualted so as to give the end product in each instance the desired tensile properties.

The method is unique in that the amounf of longitudinal reinforcement is steplessly variable during operation and in that more than 90 percent of the reinforcement can be oriented in the longitudinal direction, when necessary. It is, for example, possible to make a chimney with more longitudinal fibres and, accordingly, with a bigger bending strength at the root than at the top without any special arrangements. Chimneys and tube lines can therefore also be made with a bigger thickness of material at the fastening and supporting points. It is also possible, by means of special arrangements, to place the longitudinal reinforcement in groups along the periphery so as to form stronger longitudinal beams between more weakly reinforced areas.

If the longitudinal reinforcing strands are supplied sparsely, incomplete reinforcing layers are formed which more easily stick to each other and which hardly can be separated during harsh manipulation. These incomplete layers complement each other completely one or more times depending on the wall thickness as the work is progressing. In this way, a dense laminate is obtained without the presence of any actual whole layers. The tube wall is in this way built in a manner entirely different from previously known methods. The layers will, of course, be complete again if the longitudinal reinforcement is supplied very densely.

For very big thicknesses of material, the reinforcements of several strand supply groups can be coordinated to form a whole, said arrangement also resulting in considerable savings because the usual percentage of more expensive pretreated fibre material is quite big. Another advantage, especially in a continuous production, results from the fact that all winding and impregnation can be carried out in a concentrated and labour-saving manner on a small area.

Figure 2:
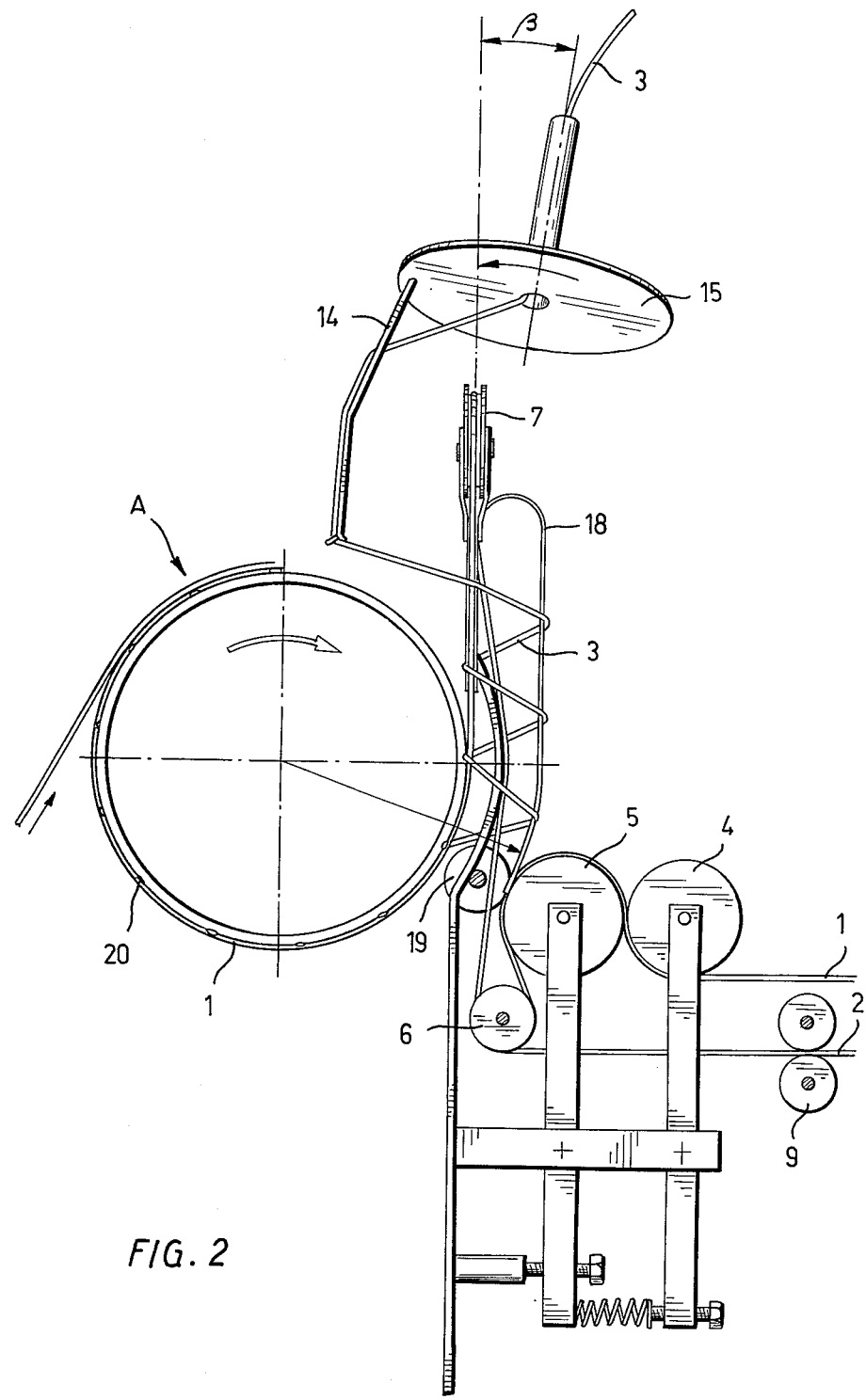
Figure 3:
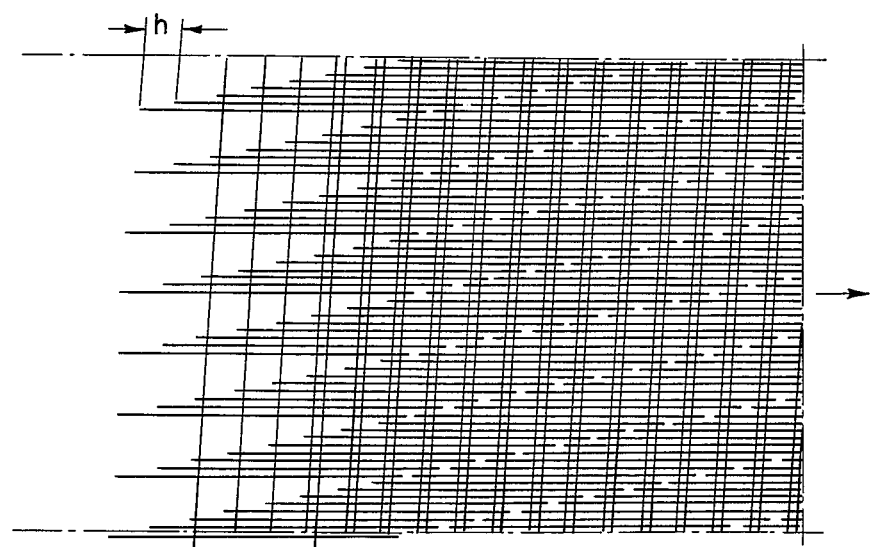
Figure 4:
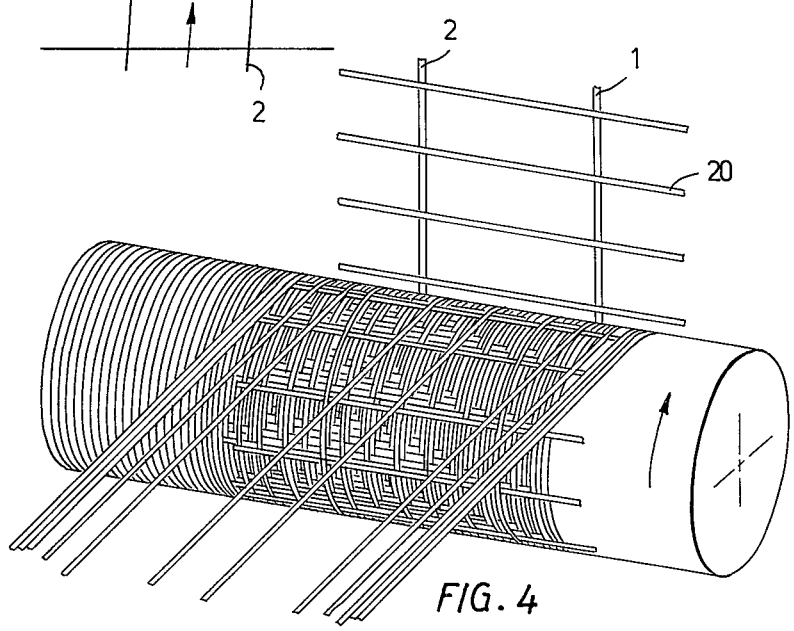
Figure 5:
Figure 6:
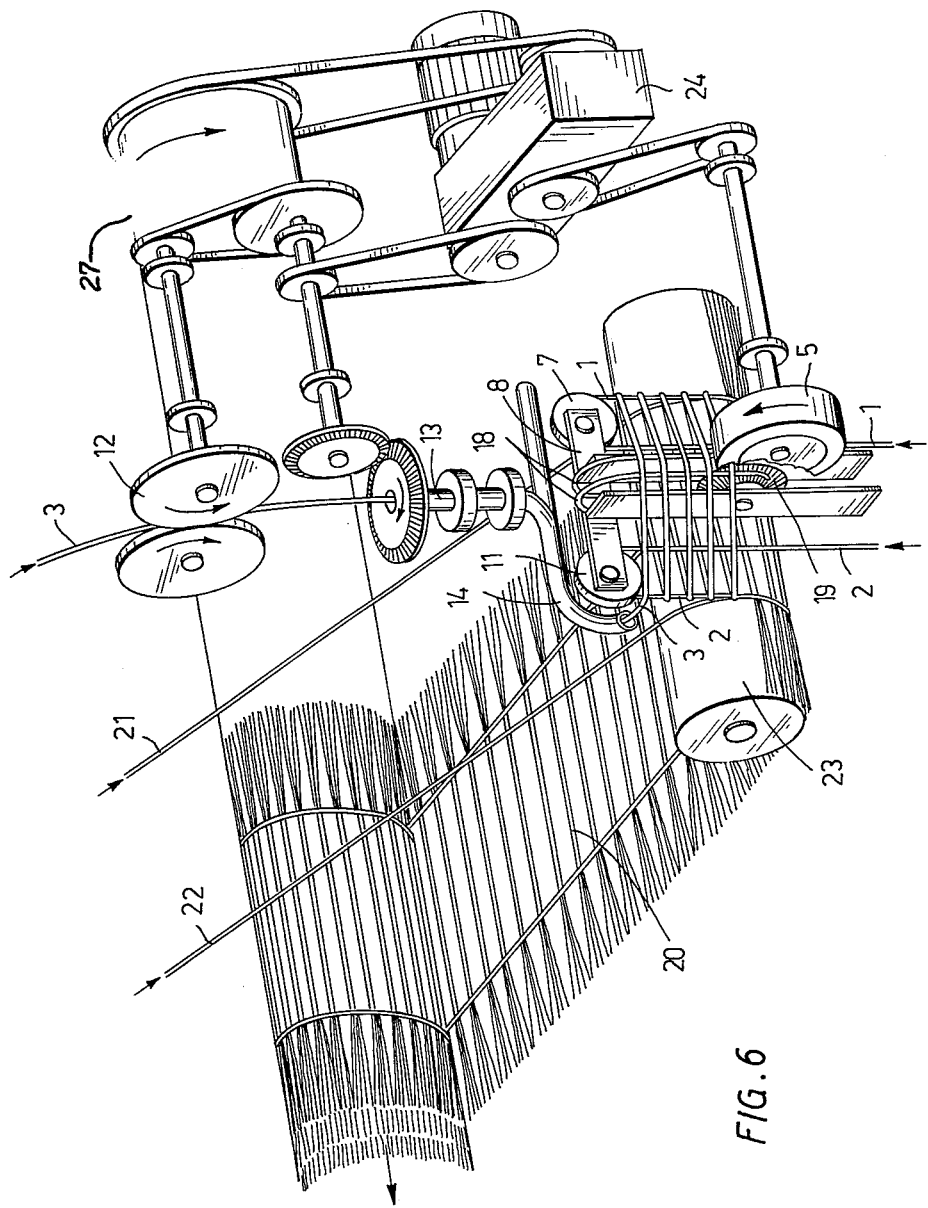

The invention and other features and advantages thereof will be described in more detail by way of example with reference to the accompanying drawing, wherein FIG. 1 is a partial schematic perspective view of the apparatus according to the invention where certain details known per se have been omitted for the sake of clarity, FIG. 2 is a side view of the apparatus according to FIG. 1, FIG. 3 is a view of a reinforcement according to the invention spread out in a plane, FIG. 4 is a perspective view of a tube blank during winding of the reinforcement, FIG. 5 shows in principle on an enlarged scale a longitudinal section of an alternative embodiment of a tube wall, and FIG. 6 shows how an auxiliary roll can be used when applying the present method.

In the figures, reference numerals 1 and 2 refer to reinforcing strands included in the tube wall and formed by glass fibres wound helically on a rotating tube blank fed in the left-hand direction in FIG. 1. The guiding strands are a part of the circularly wound reinforcement and is preferably of the same kind of fibre material as the rest of the reinforcement as this results in the purest, most homogenous and economic tube wall. For the sake of clarity, the tube blank itself has been omitted, but it is formed on a suitable mandrel as is known per se. It is also possible to let the winding apparatus move in the longitudinal direction of the tube to obtain the desired feed. Numeral 3 refers to a third glass fibre wound in loops around strands 1 and 2 and finally applied approximately parallel to the centre line of the mandrel on the surface of the tube blank. Numerals 4, 5, 6 and 10 denote rolls for feeding in and guiding the reinforcing strands 1 and 2, numerals 1 and 11 stand for guide pulleys for the reinforcing strands 1 and 2 while numeral 8 refers to stationary frame portions (only partially plotted).

A rotary disk 15 with a hollow shaft 13 and a projecting arm 14 forms a spreader for the reinforcing strand 3, numeral 18 denotes guide rails for the strand 3, numeral 19 a cutter disk and 20 a cut-off axially orientated length of strand 3.

Referring now to FIGS. 1 and 2, the apparatus operates as follows.

The supporting strand of glass fibre roving 1 supplied from a magazine is led between the tension pulley 4 and rubber roll 5 and down around the guide pulley 6, whereafter it is led up across the guide pulley 7 and down along the edge of the apparatus frame 8 provided with guide notches formed by outwardly open grooves. The apparatus frame 1 can naturally also be made simpler in structure by means of omitting the supporting rails 8 of the guiding strands. Similarly, the upper guide pulleys 7 and 11 can be complemented with lower counter wheels, and above these are placed two narrow endless belts which slide against the supporting rails 8 and which, when driven by the supporting strands, urge the loops of the reinforcing strand formed longitudinally into abutting relationship with the tube blank or an auxiliary roll (cf. FIG. 6).

Thereafter the roving 1 is wound up helically around the mandrel during the rotation and feeding thereof. The other supporting strand 2 is drawn directly via a tension apparatus 9 (FIG. 2) to the guide pulley 10 (on the same shaft as the pulley 6) and up to the guide pulley 11, whereafter it runs along the edge of the apparatus frame 8 and is wound up helically on the mandrel during the rotation thereof. The glass fibre roving strand 3 which is to form the reinforcement in the longitudinal direction of the tube is fed via a tension apparatus through the hollow shaft 13 of the strand spreader to the winding arm 14 fastened to the belt disk 15 of the strand spreader. The strand spreader is driven, for example, by a pulley 16 with a belt 17. The pulley 16 is coupled via a variator to the driving mechanism of the mandrel, whereby a desired spacing is easlily obtained between the reinforcing fibres fed to provide a dense pattern by means of adjusting the number of revolutions of the shaft 13 of the winding arm in relation to the mandrel. In addition, also the direction of the shaft 13 is preferably adjustable (angles $\alpha$ and $\beta$ in FIGS. 1 and 2). When the winding arm 14 is rotated around its axis 13, the strand 3 will, when fed at the same time, be wound up around the strands 1 and 2 on the apparatus frame 8 and the two guide rails 18 and form a triangle as seen in the direction of the guide rails. The guide rails serve to maintain a sufficiently big inner opening in the triangular loop wound up by the strand 3 so as to enable it to pass, when driven by the guide strands 1 and 2, between the cutter disk 19 and rubber roll 6, which is pressed against the cutter disk.

The cutter disk 19 and rubber roll 5 form a cutting device driven by the other guide strand. The drive can also alternatively be carried out by means of another special driving device. The disk cuts off the strand during the passage thereof, whereby the triangular loop is opened and can pass through the apparatus frame and be fed to the mandrel as a straight longitudinal reinforcing strand held by the helically wound supporting strands 1 and 2. When the loop is cut up, the longitudinal reinforcing strand is straightened out by its own rigidity, whereafter the ends can be additionally feazed by means of an air stream or an electrostatic method. The length of the longitudinal reinforcing strand is defined by the outer distance between strand 1 and 2, which can naturally be adjustable. The length of the strand can, if desired, each time be chosen in relation to the strand distance and the wall thickness of the tube.

The result of a simply supplied longitudinal reinforcing layer is shown in FIG. 3 as a mantle surface spread out. In the figure, the length of cut off roving is denoted with letter L and the feed of the tube blank per rotation with letter h.

When using the invention, a group of glass fibre roving strand is wound helically in a manner known per se around the mandrel, thereby forming the beginning of the tube blank. The winding location in relation to the reinforcement 20 in the longitudinal direction of the tube must now be placed so that the ends of the longitudinal reinforcing strands are disposed under the helically wound roving and are held by the same. Between the supporting strands 1 and 2, a smaller group of reinforcing strands can be wound helically as indicated in FIG. 4. The other end of the reinforcing fibre 20 is wound in the same way, but against the tube blank or auxiliary roll by a group of helically wound roving strand. Alternatively, e.g., strips of paper wound helically can entirely or partially replace the glass fibre strands, if allowed by the quality requirements. Simultaneously with the winding, for example, polyester resin can be supplied at arrow 2 in FIG. 2 along the entire winding area.

FIG. 5 shows in principle a longitudinal section of the tube wall formed originally. Various structures are possible.

To appropriately make use of the method when making tubes with a big diameter, an auxiliary roll according to FIG. 6 is used in lieu of the tube blank in connection with the supply of the longitudinal reinforcing strand. The auxiliary roll is arranged at a proper distance from the tube blank and possibly so that these reinforcing strands can be impregnated with resin before the winding.

In FIG. 6, the parts corresponding to those in FIG. 1 have been marked with the same reference numerals and will not be described more closely here.

The tube blank itself is denoted with numeral 27 and an auxiliary roll through which the winding is carried out is denoted with 23. To keep the cut-off strand portions 20 in correct position between the auxiliary roll 24 and the tube blank 27, helically wound auxiliary strand 21 and 22 are supplied so as to dispose the portions 20 between the auxiliary strands 21 and 22 as well as supporting strands 1 and 2. The magazines for the supporting and auxiliary strands are not shown, but they can be of any well-known type, for example, coils.

The apparatus is driven by a motor 24 which through pulleys 28 and 29 and a belt 30 as well as two gear wheels 26 and 25 drives the strand spreader having the form of a curved tube 39. The tension apparatus 12 is in turn driven through pulleys 31 and 32 and a belt 33. The tube blank itself is rotated by means of the pulley 34 driven by the motor 24 and a belt 35. Finally, the rubber roll 5 is driven through pulleys 36 and 38 by means of a belt 37.

If an auxiliary roll is used, one or more of the helically wound reinforcing strands included in the tube blank must be led over the auxiliary roll so as to remain between the roll and the longitudinal reinforcing strands to later keep these in position against the ordinary auxiliary strands until abutment against the tube blank is achieved.

Should special tube qualities require an exact axial positioning of the longitudinal strands and if a sparse supply of longitudinal reinforcing strands is desired, the winding angle thereof can be compensated by means of making the auxiliary roll somewhat conical. In a denser supply, the feeding during the winding will compensate eventual angular errors.

What I claim is:

1. A method for forming a continuous tape comprising at least two longitudinal strands and transverse cut strands and for applying the tape onto the surface of a tube blank which is continuously rotated and simultaneously moved longitudinally, comprising:
   continuously feeding at least two first strands transversely towards the tube blank,
   continuously winding consecutive loops of a second strand around said first strand, and
   cutting one side of each loop while the other side of the loop is supported between said first strands and the tube blank.

2. A method according to claim 1, wherein the loops are wound around said first strands and a support spaced from said strands in a direction away from said tube blank, the cutting being performed near said support.

3. A method for forming a continuous tape comprising at least two longitudinal strands and transverse cut strands and for applying the tape onto the surface of a tube blank which is continuously rotated and simultaneously moved longitudinally, comprising:
   continuously feeding at least two first strands transversely towards a support roll,
   continuously winding consecutive loops of a second strand around said first strands,
   continously feeding at least two third strands transversely towards said support roll to the opposite side of said loops with respect to said first strands,
   cutting one side of each loop while the other side of the loop is supported between said first and third strands and against said support roll, and
   feeding the tape formed by said first and third strands and said cut loops onto the surface of said tube blank.

4. A method according to claim 3, wherein the loops are wound around said first strands and a support spaced from said strands in a direction away from said tube blank, the cutting being performed near said support.

5. A method according to claim 3, wherein each of said third strands is fed to a position opposite one of said first strands.

6. An apparatus for forming a continuous tape comprising at least two longitudinal strands and transverse cut strands and for applying the tape onto the surface of a tube blank which is continuously rotated and simultaneously moved longitudinally, comprising:

means for feeding continuously at least two first strands transversely towards the tube blank, means for feeding and winding continuously a second strand in consecutive loops around said first strands, and means for cutting one side of each loop while the other side of the loop is supported between said first strands and the tube blank.

7. An apparatus according to claim 6, wherein the means for feeding said first strands comprise pulleys which are adjustably spaced from each other in the longitudinal direction of the tube blank.

8. An apparatus according to claim 6, wherein the means for feeding and winding said second strand comprise a rotating spreader for forming said loops around said first strands, said spreader being arranged symmetrically with respect to the feeding means for the first strands.

9. An apparatus according to claim 8, wherein the inclination of the axis of the strand spreader in relation to the direction of the supporting strands before the contact with the tube blank is adjustble.

10. An apparatus according to claim 6, wherein the cutting means comprise a cutter disk and a flexible roll mounted to cooperate therewith.

11. An apparatus according to claim 10, wherein the cutter disk is mounted to be driven by one of the supporting strands.

12. An apparatus according to claim 10, wherein the flexible roll is mounted to be driven by one of the supporting strands.

13. An apparatus for forming a continuous tape comprising at least two longitudinal strands and transverse cut strands and for applying the tape onto the surface of a tube blank which is continuously rotated and simultaneously moved longitudinally, comprising:

a support roll at a distance from the tube blank and parallel therewith, means for feeding continuously at least two first strands transversely around said support roll and towards the tube blank, means for feeding and winding continuously a second strand in consecutive loops around said first strands, means for feeding at least two third strands transversely around said support roll and towards the tube blank to the opposite side of said loops with respect to said first strands, and means for cutting one side of each loop while the other side of the loop is supported between said first and third strands and against said support roll, whereby a tape is formed at the support roll and is then fed onto the surface of the tube blank.

14. An apparatus according to claim 13, wherein the means for feeding said first strands comprise pulleys which are adjustbly spaced from each other in the longitudinal direction of the support roll.

15. An apparatus according to claim 13, wherein the means for feeding and winding said second strand comprise a rotating spreader for forming said loops around said first strands, said spreader being arranged symmetrically with respect to said feeding means for the first strands.

16. An apparatus according to claim 13, wherein the cutting means comprise a cutter disk and a flexible roll mounted to cooperate therewith.

17. An apparatus according to claim 16, wherein the flexible roll is mounted to be driven by one of the supporting strands.

18. An apparatus according to claim 16, wherein the cutter disk is mounted to be driven by one of the supporting strands.

19. An apparatus according to claim 18, wherein the inclination of the axis of the strand spreader in relation to the direction of the supporting strands before the contact with the support roll is adjustable.

* * * * *